United States Patent
Kim et al.

(10) Patent No.: US 8,351,904 B2
(45) Date of Patent: Jan. 8, 2013

(54) MOBILE TERMINAL AND COMMUNICATION HISTORY PROVIDING METHOD USING THE SAME

(75) Inventors: Kyung Jin Kim, Seoul (KR); Jee Young Chun, Seoul (KR); Sae Kyu Park, Seoul (KR); Yong Man Park, Seoul (KR); Ji Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 347 days.

(21) Appl. No.: 12/427,235

(22) Filed: Apr. 21, 2009

(65) Prior Publication Data

US 2010/0075637 A1    Mar. 25, 2010

(30) Foreign Application Priority Data

Sep. 23, 2008  (KR) ................. 10-2008-0093245
Mar. 20, 2009  (KR) ................. 10-2009-0024065

(51) Int. Cl.
*H04M 1/725* (2006.01)

(52) U.S. Cl. ............... 455/412.1; 455/412.2; 455/414.1; 455/550.1; 455/566; 379/142.04; 379/93.23

(58) Field of Classification Search ............... 455/550.1, 455/566, 412.1, 412.2, 414.1; 379/142.04, 379/93.23
See application file for complete search history.

(56) References Cited

U.S. PATENT DOCUMENTS

| | | | |
|---|---|---|---|
| 7,248,677 B2* | 7/2007 | Randall et al. ............. | 379/93.23 |
| 7,930,634 B2* | 4/2011 | Nakamura .................... | 715/273 |
| 2005/0064844 A1 | 3/2005 | McAvoy et al. | |
| 2006/0023722 A1 | 2/2006 | Jung et al. | |
| 2006/0025112 A1* | 2/2006 | Hamanaga et al. ........ | 455/412.1 |
| 2007/0201681 A1 | 8/2007 | Chen et al. | |
| 2008/0139225 A1 | 6/2008 | Hsieh et al. | |
| 2009/0168115 A1* | 7/2009 | Kunii ............................ | 358/444 |
| 2009/0296903 A1* | 12/2009 | Lippman et al. ........... | 379/93.23 |

* cited by examiner

*Primary Examiner* — Amancio Gonzalez
(74) *Attorney, Agent, or Firm* — Birch, Stewart, Kolasch & Birch, LLP

(57) ABSTRACT

A mobile terminal including a communication unit configured to provide a communication function including at least one of an outgoing communication function and an incoming communication function, a controller configured to acquire surrounding data including at least one of image data or sound data corresponding to a surrounding of where the communication function is performed, and to match the acquired surrounding data with communication information indicating a first party of the outgoing function or a second party of the incoming communication function, and a display unit configured to display a communication history including the communication information matched with the surrounding data. In addition, the controller is further configured to acquire the surrounding data selectively based on a) a manual operation of the terminal or b) automatically without user intervention.

24 Claims, 11 Drawing Sheets

MOBILE TERMINAL AND COMMUNICATION HISTORY PROVIDING METHOD USING THE SAME

This application claims the benefit of Korean Patent Application No. 10-2008-0093245 filed on Sep. 23, 2008, which is hereby incorporated by reference.

BACKGROUND OF THE INVENTION

1. Field of the Invention

The present application is related to a mobile terminal and corresponding method for providing a history of a communication function such as transmission/receipt of calls and messages using the mobile terminal.

2. Description of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

Thus, the user can perform dialing/receiving call functions and sending/receiving message functions in addition to a plurality of other different functions. The user can also view previous calls sent and received, messages sent and received, etc. by selecting a history menu option on the terminal.

However, the history information provided with the history menu option is limited and provides merely the time and party of the calls/messages. Therefore, the user is only provided with minimal information about the call or message received/sent, etc.

SUMMARY OF THE INVENTION

Accordingly, one object of the present application is to address the above-noted and other drawbacks.

Another object of the present application is to provide the user with information corresponding to a call/message received and sent that reminds the user about the contents of the call/message received and sent, where the call/message was sent/received, etc.

To achieve these and other advantages and in accordance with the purpose of the present invention, as embodied and broadly described herein, the present invention provides in one aspect a mobile terminal including a communication unit configured to provide a communication function including at least one of an outgoing communication function and an incoming communication function, a controller configured to acquire surrounding data including at least one of image data or sound data corresponding to a surrounding of where the communication function is performed, and to match the acquired surrounding data with communication information indicating a first party of the outgoing function or a second party of the incoming communication function, and a display unit configured to display a communication history including the communication information matched with the surrounding data. In addition, the controller is further configured to acquire the surrounding data selectively based on a) a manual operation of the terminal or b) automatically without user intervention.

In another aspect, the present invention provides a method of controlling a mobile terminal, and which includes acquiring surrounding data including at least one of image data or sound data corresponding to a surrounding of where a communication function is performed on the terminal, the communication function including at least one of an outgoing communication function and an incoming communication function, matching the acquired surrounding data with communication information indicating a first party of the outgoing function or a second party of the incoming communication function, and displaying a communication history including the communication information matched with the surrounding data. Further, the acquiring step acquires the surrounding data selectively based on a) a manual operation of the terminal or b) automatically without user intervention.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention, and wherein.

DETAILED DESCRIPTION OF PREFERRED EMBODIMENTS

Reference will now be made in detail to the preferred embodiments of the present invention, examples of which are illustrated in the accompanying drawings.

Figure 1:
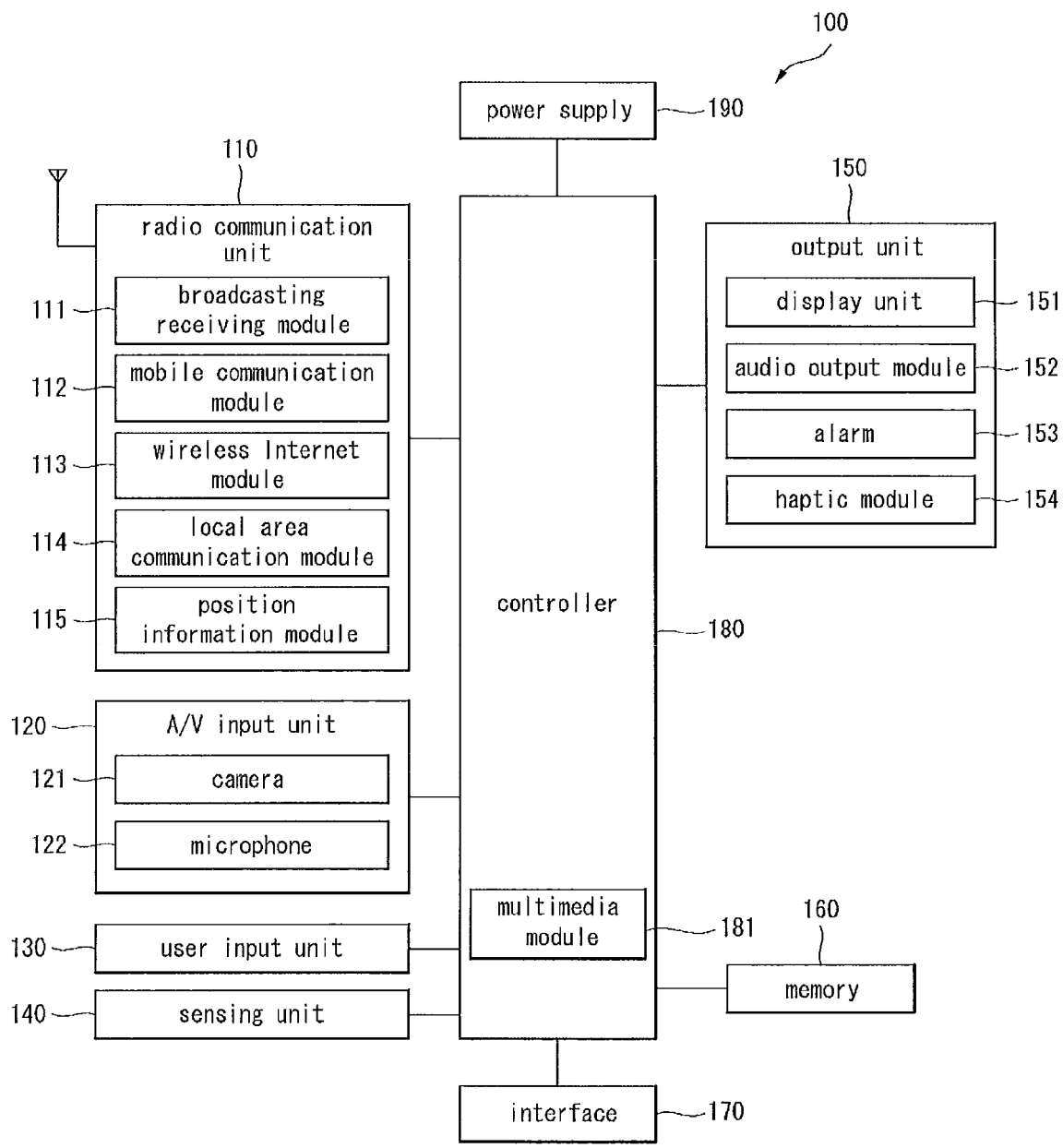
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broad casting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) system, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), World interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received. In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display unit 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touchpoint of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phonebook, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Figure 2A:
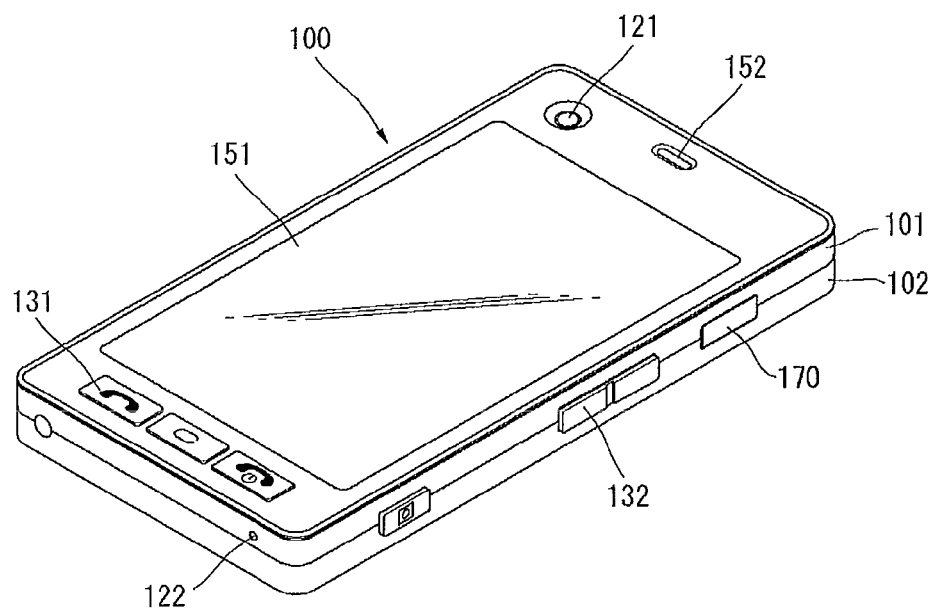
FIG. 2a is a front perspective view of a mobile terminal according to an embodiment of the present invention.

Next, FIG. 2a is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2a, the display unit 151, the audio output unit 152, the camera 121, a user input unit 131 and 132, the microphone 122 and the interface 170 are arranged in the terminal body, specifically, in the front case 101. In addition, the display unit 151 occupies most of the main face of the front case 101.

Further, the audio output unit 152 and the camera 121 are arranged in a region in proximity to one of both ends of the display unit 151. Also, the user input unit 131 and the microphone 122 are located in a region in proximity to the other end of the display unit 151. Also include is another user input unit 132, which is arranged with the interface 170 on the sides of the front case 101 and the rear case 102.

Thus, in this embodiment, the user input unit 130 includes multiple operating units 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling.

Also, the operating units 131 and 132 can receive various inputs. For example, the operating unit 131 receives commands such as start and end a call, and the operating unit 132 receives commands such as to control the volume of the sound output from the audio output unit 152 or to convert the display unit 151 into a touch recognition mode.

Figure 2B:
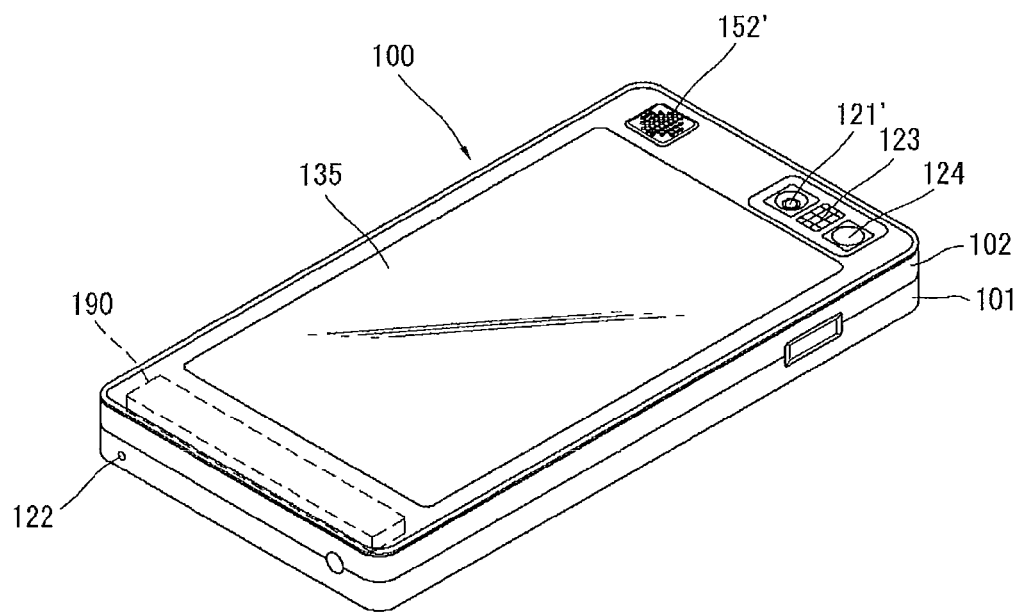
FIG. 2b is a rear perspective view of the mobile terminal according to an embodiment of the present invention.

Next, FIG. 2b is a rear perspective view of the handheld terminal shown in FIG. 2a according to an embodiment of the present invention. As shown in FIG. 2b, a camera 121' is additionally attached to the rear side of the terminal body, that is, the rear case 102. In this configuration, the camera 121' has a photographing direction that is opposite to that of the camera 121 shown in FIG. 2a and can have pixels different from those of the camera 121 shown in FIG. 2a.

For example, in one embodiment, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2b, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2a and be used in a speaker phone mode when the terminal is used for a telephone call.

A broadcasting signal receiving antenna can also be additionally attached to a side of the terminal body in addition to an antenna for telephone calls. The antenna forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2b also illustrates a touch pad 135 for sensing touch additionally attached to the rear case 102 of the terminal 100. Further, the touch pad 135 can be a light transmission type as the display module 151. In this instance, when the display unit 151 outputs visual information through both sides, the visual information can be recognized through the touch pad 135.

Also, the information output through both sides of the display module 151 can be controlled by the touch pad 135. In addition, a display can be additionally attached to the touch pad 135 such that a touch screen can be arranged even in the rear case 102. Further, the touch pad 135 operates in connection with the display unit 151 of the front case 101, and can be located in parallel with the display unit 151 behind the display unit 151. The touch panel 135 can also be identical to or smaller than the display unit 151 in size.

The interoperations of the display unit 151 and the touch pad 135 will now be described with reference to FIGS. 3a and 3b. In more detail, FIG. 3a and 3b are front views of the handheld terminal 100 and are used for explaining an operating state of the handheld terminal according to an embodiment of the present invention.

The display unit 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
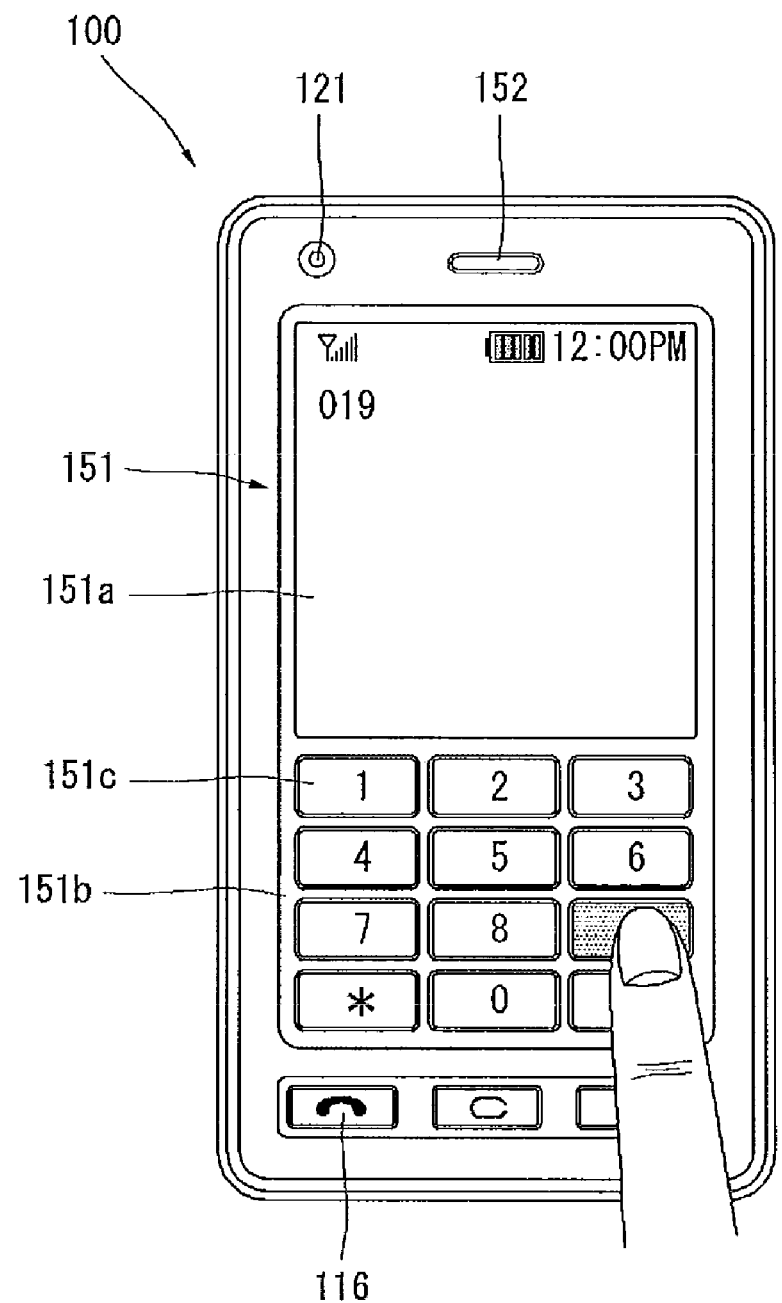
FIG. 3a is a front view of the mobile terminal according to an embodiment of the present invention.
Figure 3B:
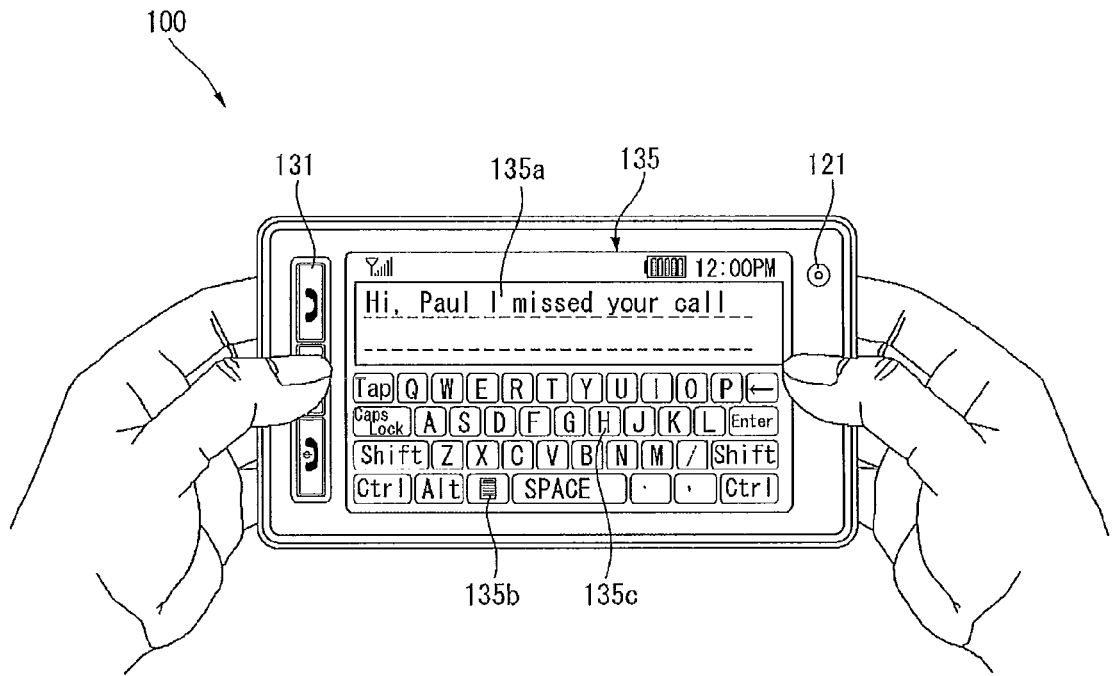
FIG. 3b is another front view of the mobile terminal according to an embodiment of the present invention.

Further, FIG. 3a shows that touch applied to a soft key is input through the front side of the terminal body. The display unit 151 can be a single area or can be divided into a plurality of regions. In the latter instance, the display unit 151 is constructed such that the plurality of regions interoperate with each other.

For example, and as shown in FIG. 3a, an output region 151a and an input region 151b are respectively displayed in upper and lower parts of the display unit 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first operating unit 116, a connection of a call corresponding to a telephone number displayed on the output region 151a is attempted.

Next, FIG. 3b is an overview of the mobile terminal 100 showing that touch applied to soft keys is input through the rear side of the terminal body. FIG. 3b also shows the landscape of the terminal body while FIG. 3a shows the portrait of the terminal body. In addition, the display unit 151 is constructed such that an output image is converted according to the direction in which the terminal body is located.

Further, FIG. 3b shows the operation of the handheld terminal in a text input mode. As shown, the display unit 151 includes a touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of qwerty keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with user's fingers when the soft keys 135c are touched as compared to touch input through the display unit 151. Further, when the display unit 151 and the touch pad 135 are transparent, the user can see his or her fingers located behind the terminal body, and thus can select items by touching the backside or surface of the displayed keys 135c.

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

The proximity sensor described with reference to FIG. 1 will now be explained in more detail with reference to FIG. 4. That is, FIG. 4 is a conceptual diagram used for explaining a proximity depth of the proximity sensor.

Figure 4:
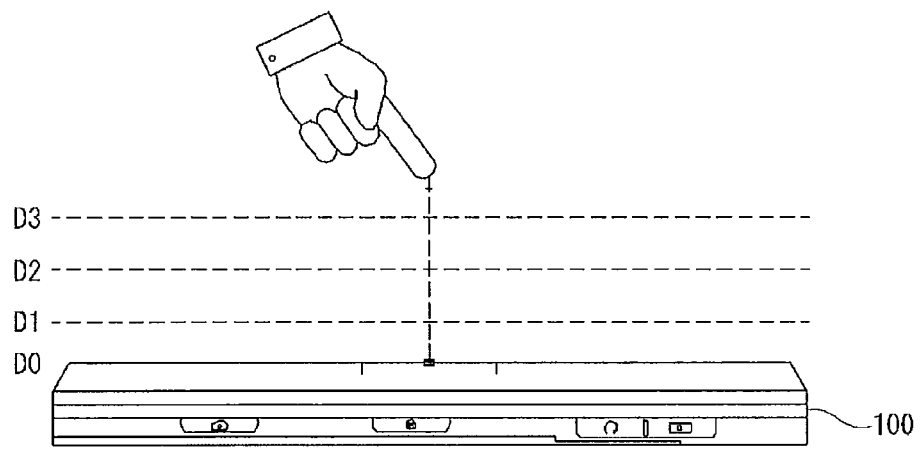
FIG. 4 is a conceptual view illustrating a proximity depth of a proximity sensor according to an embodiment of the present invention.

As shown in FIG. 4, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 4 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 4, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

The following description refers to communication functions as calling and messaging functions. Further, the communication history includes a call history and a message history. However, the present invention, also corresponds to other types of communication functions.

In addition, the calling function includes a call dialing function and a call receiving function, and the call history includes a dialed call item, a received call item, a missed call item, etc. Also, a call item included in the call history indicates a calling function has been performed. For example, the call history can include for each calling function the other party of the calling function, the time when the calling function was started and ended, the duration during of the calling function, and so forth.

Similarly, the messaging function includes a message sending function and a message receiving function, and the message history includes a sent message item and a received message item. Also, the message item in the message history indicates a messaging function was performed. For example, the message history can include for each message function the other party of the messaging function, the time when the messaging function was started and ended, and so forth. In addition, the message functions can include an SMS (short message service) message, an MMS (multimedia messaging service) message, an e-mail message, etc.

Figure 5:
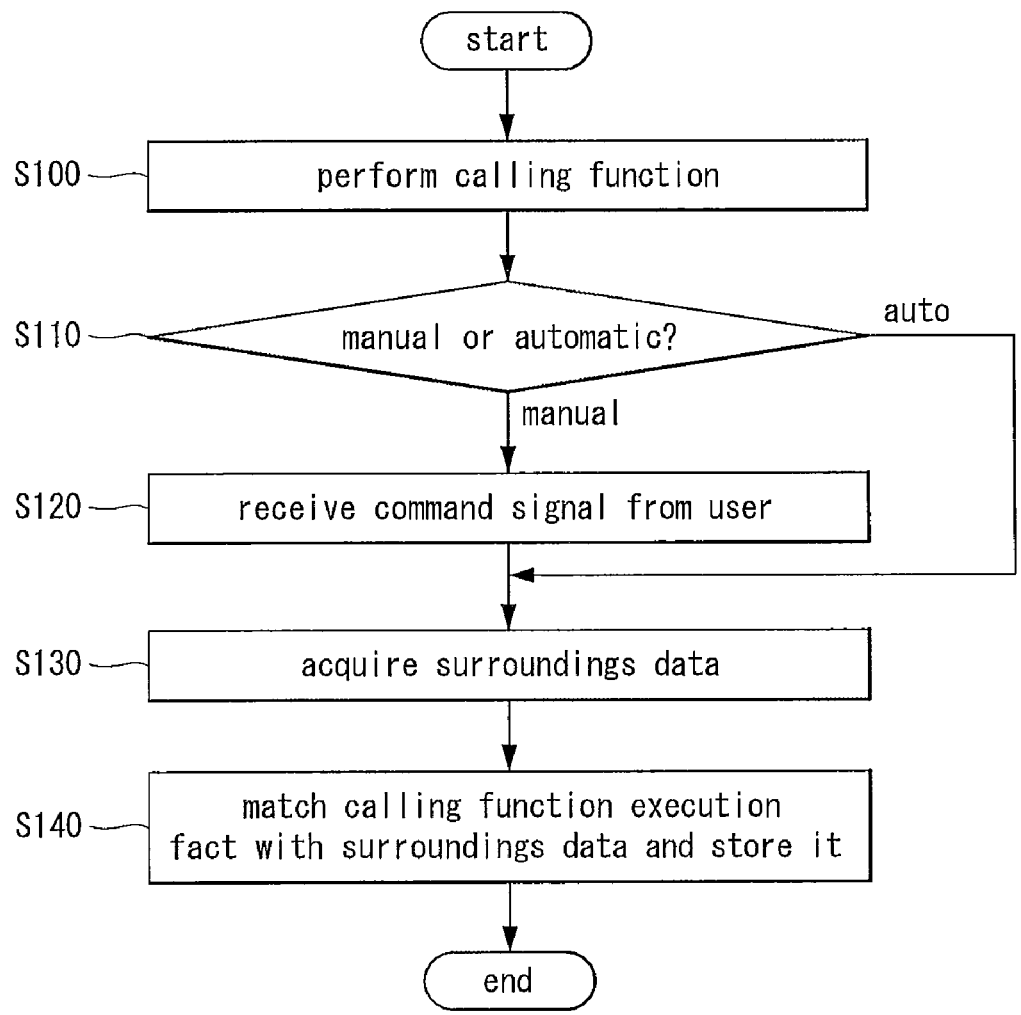
FIG. 5 is a flowchart illustrating a communication history method of a mobile terminal according to a first embodiment of the present invention.

Next, FIG. 5 is a flowchart illustrating a communication history method according to a first embodiment of the present invention.

<Call History Management>

As shown in FIG. 5, the controller 180 first performs a calling function (step S100). For instance, the user using the terminal may place a call to another party or may receive a call from another party. In addition, the controller 180 can perform the calling function using a communication module such as the mobile communication module 112 and/or the wireless Internet module 113.

Further, the controller 180 then determines whether the terminal 100 has been configured to automatically capture surrounding data or to manually capture surrounding data (S110). In more detail, the terminal 100 can be configured to manually capture surrounding data based on a command signal from the user to take one or more pictures, movies or sound data or to automatically capture the surrounding data. The user can also set the manual or automatic capturing mode for the surrounding data using the appropriate menu options provided on the terminal according to an embodiment of the present invention.

If the controller 180 determines the manual capturing mode has been set on the terminal 100 (manual in step S110), the controller 180 waits to receive a command signal from the user (step S120) indicating the surrounding data is to be captured. The controller 180 then captures the surrounding data (step S130)

For example, the user can request the surrounding data be captured in the beginning of the call, during the middle of the call or immediately after the call is performed. The manual mode is particular advantageous because the user can selectively determine what image, movie or sound is to be captured and associated with the call. For example, the user may be a coffee shop such as Starbucks, and want a still image captured of the Starbucks coffee logo because the user will easily remember that particular call was performed while at the Starbucks coffee shop.

Thus, the user is given great latitude in determining which surrounding data is to be captured with the current call, and each user may have different surrounding data that will better help them remember the contents of a particular call, where the call was performed, etc. For example, the Starbucks logo may remind one user of where the call was placed, and remind a second user about a particular person that he or she always meets at Starbucks for coffee.

If the controller 180 determines the automatic surrounding data acquisition mode has been set (automatic in step S110), the controller 180 automatically captures the surrounding data without waiting for a command signal from the user (step S130). In addition, in the automatic capturing mode, the user can also specify at what time intervals, for example, the surrounding data is to be automatically captured.

For example, when the user is setting the terminal in the automatic capturing mode, the controller 180 can prompt the user to determine if the surrounding data should be automatically captured at the beginning of the call, 2 minutes into the call, after the call, etc. Thus, in this example, the user can set the automatic mode to capture the data 1 minute after the beginning of the call, which will give the user the appropriate amount of time to move the camera of the terminal to an object the user wants to capture to remember what the call was about, where the call was placed, etc. Thus, the user can set the automatic mode and then not need to actually press the camera operating button to take an image, but rather the controller 180 automatically captures the image one minute after the start of the call. The user can also request a plurality of images be automatically captured (e.g., at the beginning of the call, every minute after the start of the call, at the end of the call, etc.).

Also, the controller 180 matches the calling function with the acquired surrounding data and stores the matched information in the memory 160 (step S140). Thus, the call history includes records indicating a particular call has been received or sent together with the captured surrounding data. The surrounding data may also be stored immediately after being captured or stored based on a user selecting a predetermined key, for example.

In addition, before matching the calling function with the acquired surrounding data, the controller 180 can prompt the user to determine if the user wants to match the calling function with the acquired surrounding data. For example, a captured surrounding data may be distorted and thus the user could first view or listen to the captured surrounding data and then either keep it or delete it.

Further, the surrounding data may include various types of data such as still or moving image data acquired through the camera 121. Also, the surrounding data may also include sound data acquired through the microphone 122. The controller 180 also can store the image data and the sound data in the memory 160 using various file formats. For example, the still image can be stored as a JPG or TIF file format, the moving image can be stored with a file format, for example, such as a AVI, DIVX, ASF, MPG, MPEG, MP4, and MOV, and the sound data can be stored as a file format such as a WAV, WMV, AC3, and OGG.

Examples of Call History Management

Figure 6:
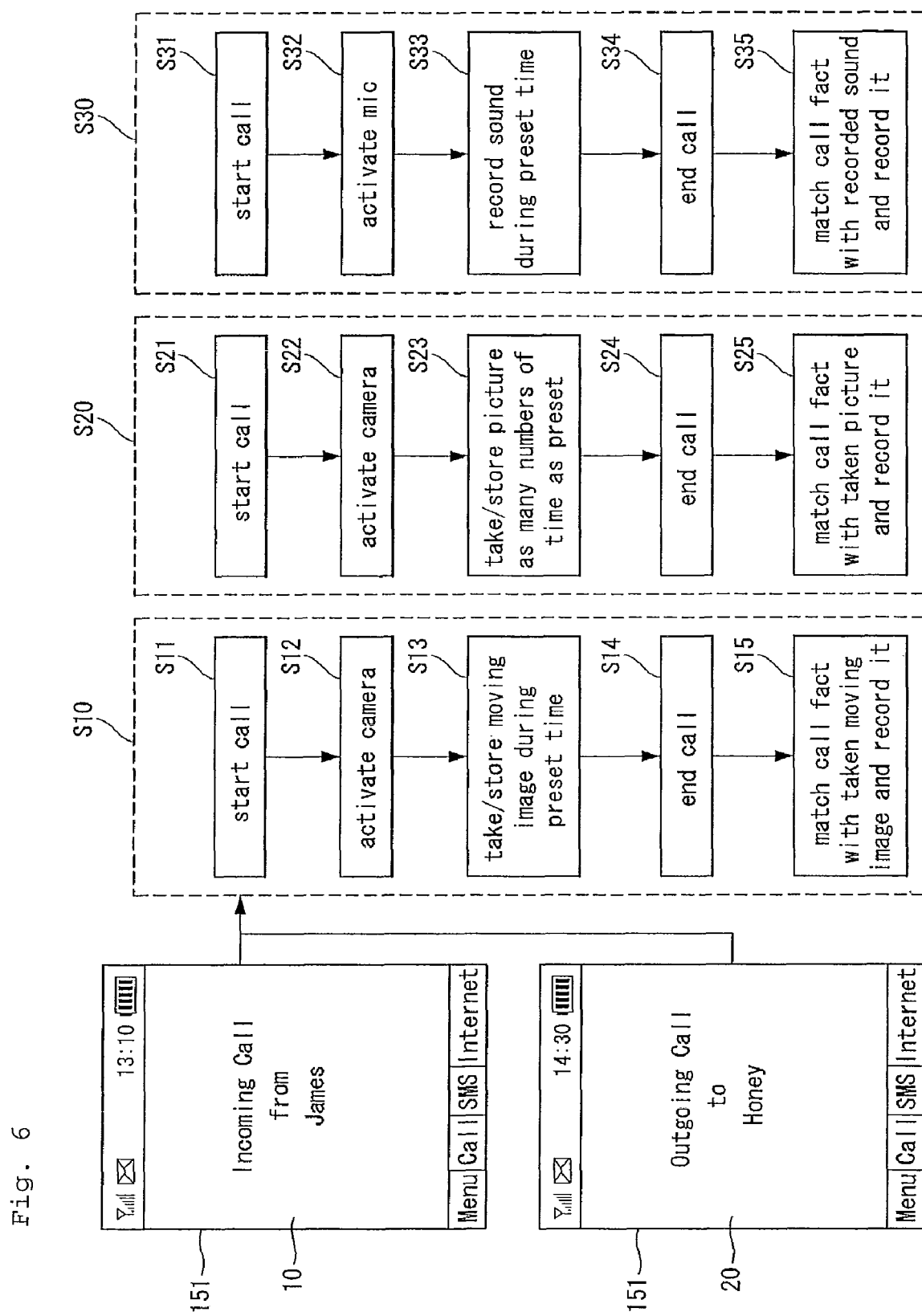
FIG. 6 is another flowchart illustrating the communication history method according to the first embodiment of the present invention.

The communication history method according to the first embodiment of the present invention will now be described in more detail with reference to FIG. 6. That is, FIG. 6 illustrates the controller 180 displaying a call receiving screen 10 on the display 151 when a call is received from "James", and a call dialing screen 20 on the display 151 when a call is dialed to "Honey". The method of providing a communication history for a calling function can be performed in a variety of ways according to the first embodiment of the present invention. For example, reference numbers S10, S20 and S30 represent there different possible ways of providing a communication history according to the first embodiment.

In particular, reference numeral "S10" in FIG. 6 illustrates the surrounding data included with the communication history being a moving image acquired through the camera 121. In more detail, when the user starts a call (e.g., receives a call from "James" or makes a call to "Honey") (step S11), the controller 180 activates the camera 121 (step S12) and the camera 121 captures a moving image manually or automatically as discussed with respect to FIG. 5 (step S13). The captured moving image is also stored in the memory 160.

Then, when the call is finished (step S14), the controller 180 matches the stored moving image with the information that the call has been dialed in a call history (step S15). Therefore, the captured moving image is a moving image acquired from the surrounding area of the mobile terminal 100 while the call is performed. The controller 180 can also record sound information corresponding to the surrounding area of the call and match the recorded sound with the call history and/or the moving image.

Reference numeral "S20" in FIG. 6 illustrates an alternative example in which the controller 180 controls the camera 121 to capture a still image that is to be used as the surrounding data. As shown, when the call is started (step S21), the controller 180 activates the camera 121 (step S22) to take a number of still pictures or images automatically or manually (step S23). The number of pictures to be taken can be a default number or can be set by the user of the terminal. The controller 180 also stores the captured still image or images in the memory 160.

When the call is finished (S24), the controller 180 matches the captured still images with the information that the call has been started and stores this in a call history (step S25). Therefore, the captured moving image is at least one still image acquired from the surrounding area of the mobile terminal 100 while the call is performed. The controller 180 can also record sound information corresponding to the surrounding area of the call and match the recorded sound with the call history and/or the still image(s).

Reference numeral "S30" in FIG. 6 illustrates another example in which sound data is acquired through the microphone 122 as the surrounding data. That is, when the call is started (S31), the controller 180 activates the microphone 122 (step S32) to acquire sound data during a preset time automatically or manually (step S33). The preset time to acquire sound data can be a default time, set by a user, etc. The sound data is also stored in the memory 160.

When the call is finished (S34), the controller 180 matches the acquired sound data with the information that the call has been started in a call history (step S35). Therefore, the acquired sound data corresponds to the surrounding area of the mobile terminal 100 while the call is performed. In addition, as discussed above, the controller 180 can first prompt the user to determine if the user wants to save and match the captured image or sound data with the call information.

Therefore, according to the first embodiment, the user can quickly remember more information about a particular call, because the call is associated with surrounding information indicating where the call occurred, for example. For instance, the user may remember the place where the call was performed by seeing the still image or moving image, or by hearing the acquired sound data. This makes it much easier for a user to remember information about particular calls, especially when the user is viewing multiple calls. Also, if the user missed a call, the user can view or listen to the captured data to better remember where the user was when the call was missed.

Also, the call history may be displayed on the display unit 151 in response to a call command from the user. For instance, the user may select a desired type of call history by manipulating the user input unit 130 to search for menu hierarchies.

Display of Call History

Further, the controller 180 can display the call history on the display unit 151 in a variety of different ways. FIGS. 7-9 illustrate different methods of displaying the call history according to embodiments of the present invention. In these Figures, the controller 180 displays the call information together with captured video/still images and/or sound data.

Surrounding Still-image Data

Figure 7A:
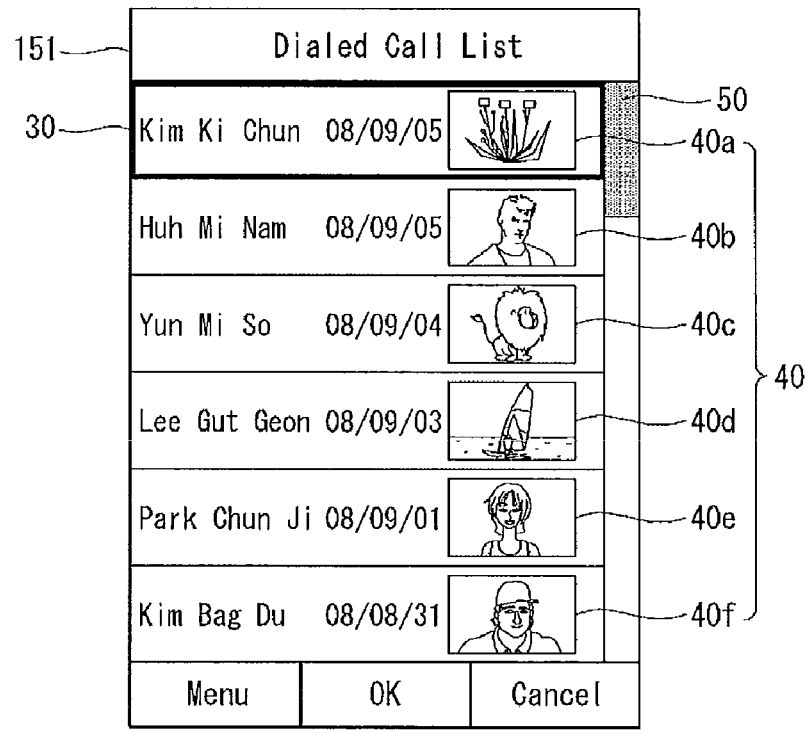
FIGS. 7-9 include display screens illustrating the communication history method according to the first embodiment of the present invention.
Figure 7B:
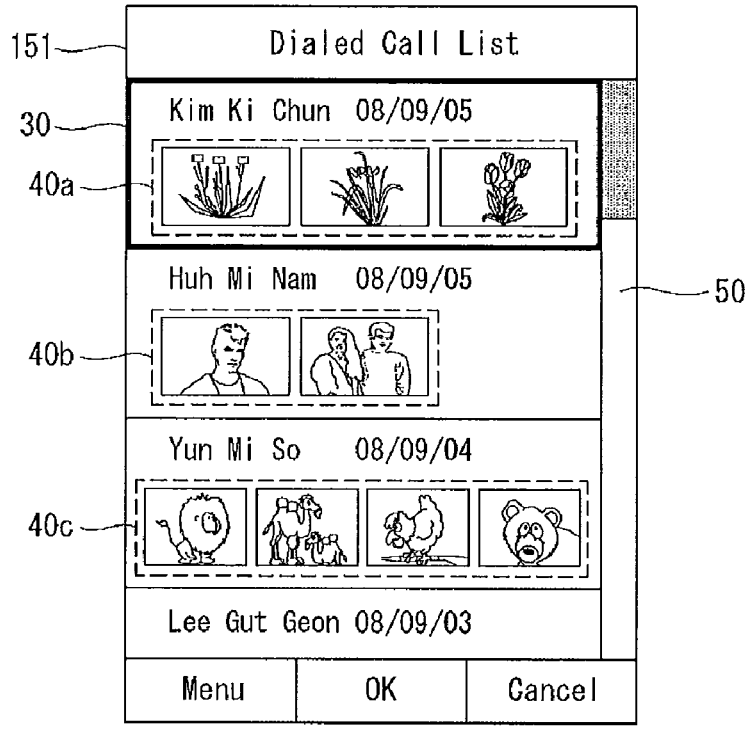
Figure 7C:
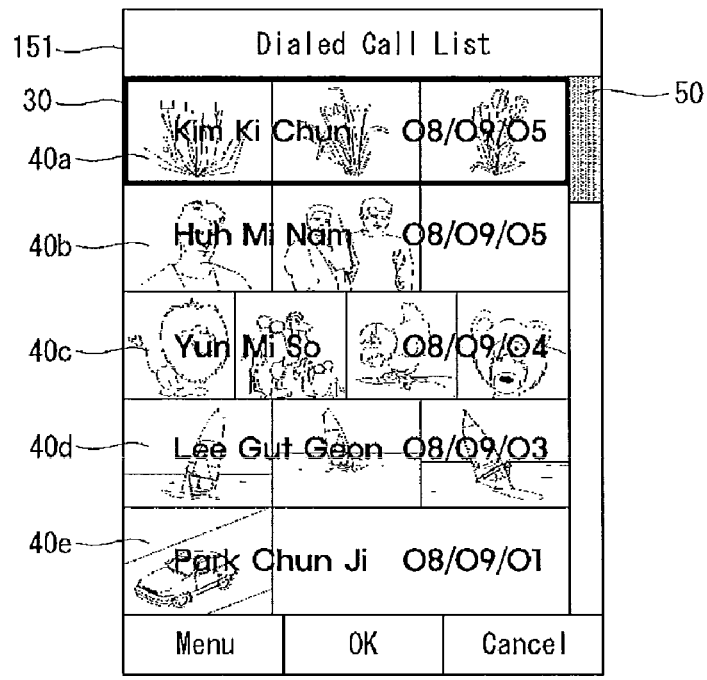

FIGS. 7*a*-7*c* are overviews of display screens illustrating a captured still image 40 being stored and matched with call information about a particular call. For example, FIG. 7*a* illustrates a call history including a plurality of dialed call items included information about the called party and a corresponding still image 40 associated with the particular call being displayed on the display 151. The date (and/or time) of the call is also displayed in this example.

Thus, as shown in FIG. 7*a*, the call history includes information indicating the user of the terminal called "Lee Gut Geon" as the other party on Sep. 3, 2008, and includes the picture 40*d* taken at that time (i.e., the surrounding data) displayed together on the display unit 151. Therefore, the user can quickly determine that the call to "Lee Gut Geon" was made when the user was at the seashore (because the still image is a picture of the seashore).

The controller 180 can also display an indicator 30 to highlight or indicate a call item in a call history list is currently selected. The user can also move between the different call items in the call history using a cursor key, performing a touch input operation on the display 151 including the touch screen, etc.

Further, the controller 180 can display all acquired or captured surrounding data for each call item in the call history list as shown in FIG. 7*a*, or can only display surrounding data for a particular call when the call item in the history list is selected. For example, the controller 180 can display the image 40*a* for the first call item 30 that is selected in FIG. 7*a*, and not display the other images 40*b*-40*f* for the other calls.

The controller 180 can also emphatically display a selected call item by increasing the size of the selected call item (e.g., call item 30) compared to other call items. Further, as shown in FIG. 7*a*, the controller 180 also displays a scroll bar 50 that the user can use to scroll through different call items in the call history list.

Next, FIGS. 7*b* and 7*c* illustrate plural pictures being captured, stored and associated with a calling function. For example, FIG. 7*b* illustrates three pictures 40*a* associated with the first call item, two pictures 40*b* associated with the second call item, four pictures 40*c* associated with the third call item, etc. Thus, the user can view the plural pictures to better remember where they were when the call was performed or to better remember what the call was about. FIG. 7*b* also illustrates the first call item being emphasized as in FIG. 7*a*.

FIG. 7*c* illustrates the captured images being displayed together with the text information about the call (name, date, etc.) in an overlapping transparent manner. The controller 180 can also change the text so the user can better see the text information. For example, the controller 180 can vary the font, size, and color of the text information. In addition, the controller 180 can also display the captured images to be translucent or hazy so the user can better see the text information together with the captured images.

Further, in FIGS. 7*a*-7*c*, the user can select a particular call item by touching the call item, manipulating a particular key on the input unit 130, etc. to see additional information about the selected call item, to call back the party associated with the call item, etc. The additional information may be a called start and end time, a length of the call, a phone number of the other party, etc. The controller 180 can also magnify the selected picture or display the selected call item in a full screen mode.

The controller 180 can also magnify only the detailed text information when the text information is selected and not magnify the image associated with the text image, can magnify only the captured image and not the text information when the captured image is selected, or can magnify both the text information and the captured image when either the text information or captured image is selected.

Surrounding Moving-image Data

Figure 8A:
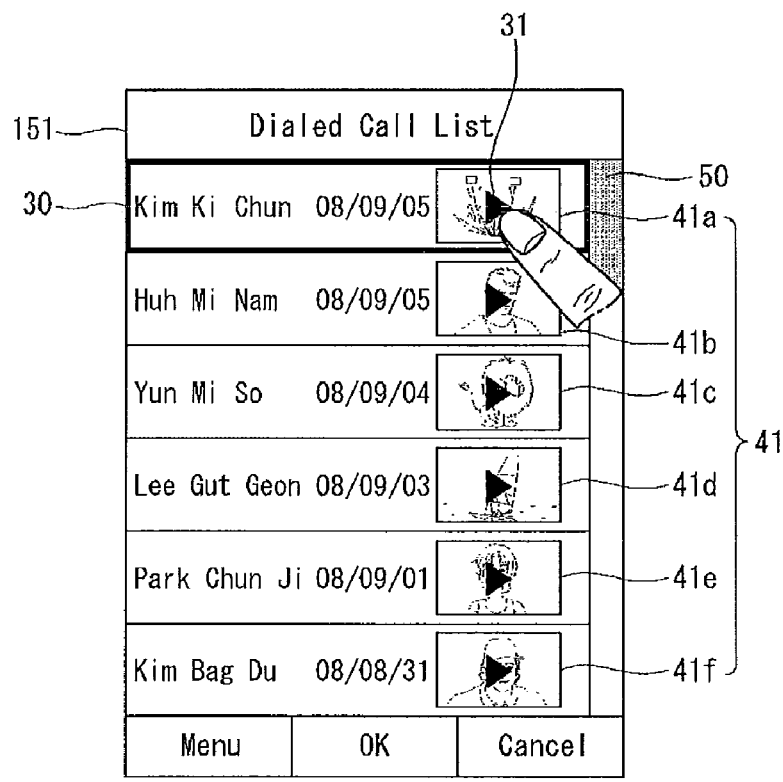
Figure 8B:
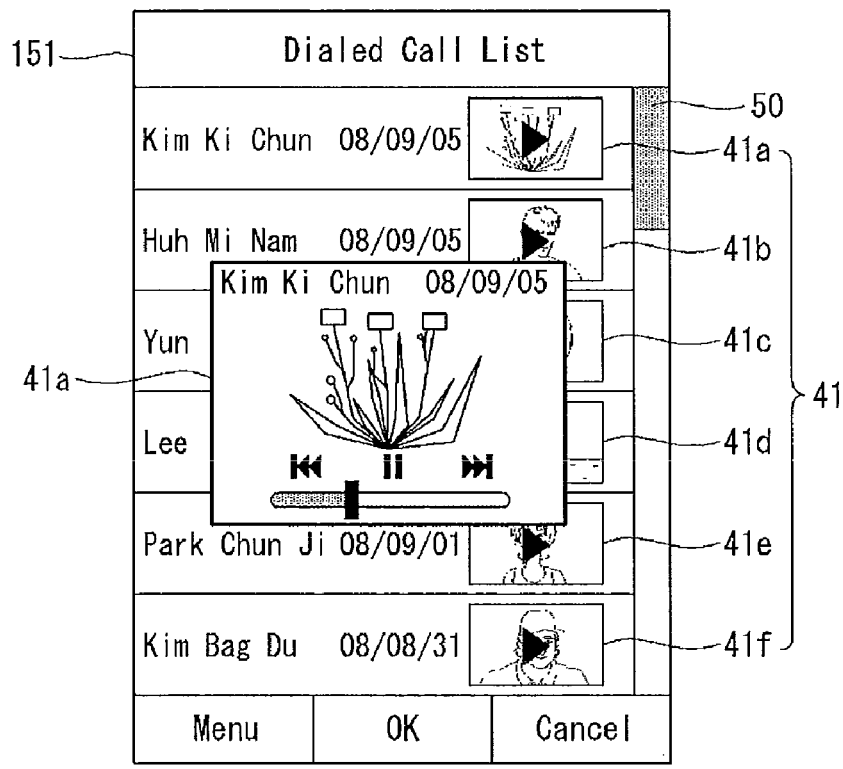
Figure 9:
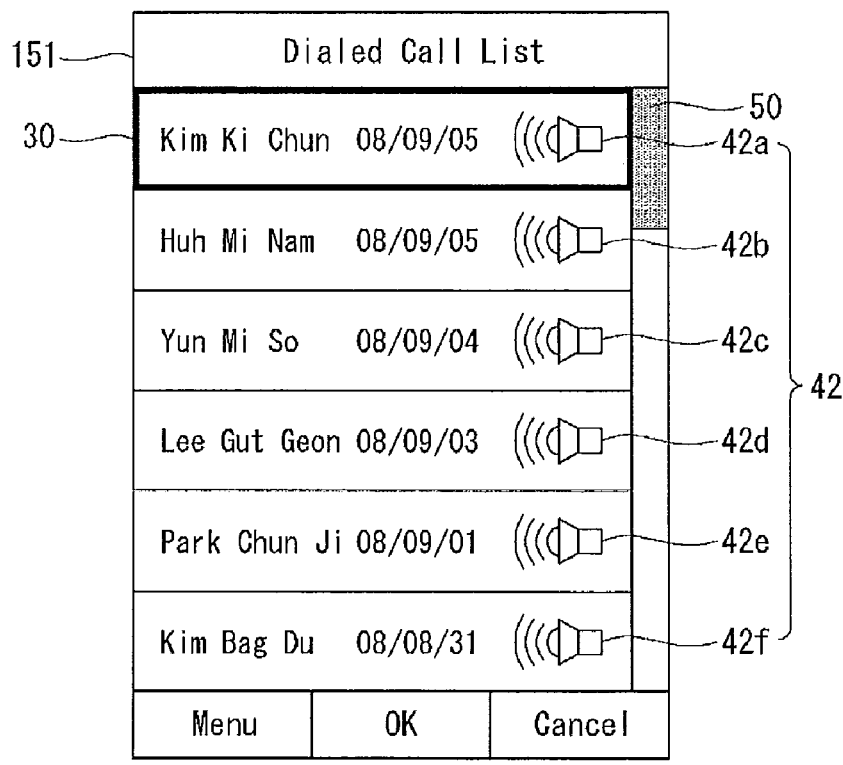

Next, FIGS. 8*a* and 8*b* are overviews of display screens illustrating moving picture data 41 being associated or matched with call items. As shown, the controller 180 also displays a replay button or icon 31 that the user can select to play the moving image that represents the surrounding data. FIG. 8*a* illustrates the user touching the icon 31 of the moving image 41*a*, and FIG. 8*b* illustrates the controller 180 playing the moving image on the display screen 151.

Further, as shown in FIG. 8*b*, the controller 180 enlarges or displays the moving image 41*a* in a pop-up window so the user can better see the moving image. Thus, the user can quickly remember where he or she was when the call was performed, remember information about the contents of the call, etc. by viewing the moving image 40.

The controller 180 can also display or reproduce all moving images matched respectively to the plural call items, or just display or reproduce only the moving image related to a selected call item. The controller 180 can also selectively output audio data for each moving image based on a selected item. For example, the controller 180 can output the moving images but not output the audio data for the moving images, etc.

Surrounding Sound Data

Next, FIG. 9 is an overview of a display screen illustrating captured sound data being used as the surrounding data and being matched with call items. In addition, as shown, the controller 180 displays a speaker-shaped button or icon 42 to represent that the surrounding data is sound data. The user can then select or touch the specified icon 42*a* to hear the sound data that was captured during the call. That is, the controller 180 outputs the corresponding sound data via the audio output module 152. The controller 180 can also selectively output the sound data for each or all call items.

<Message History Management and Display>

Figure 10:
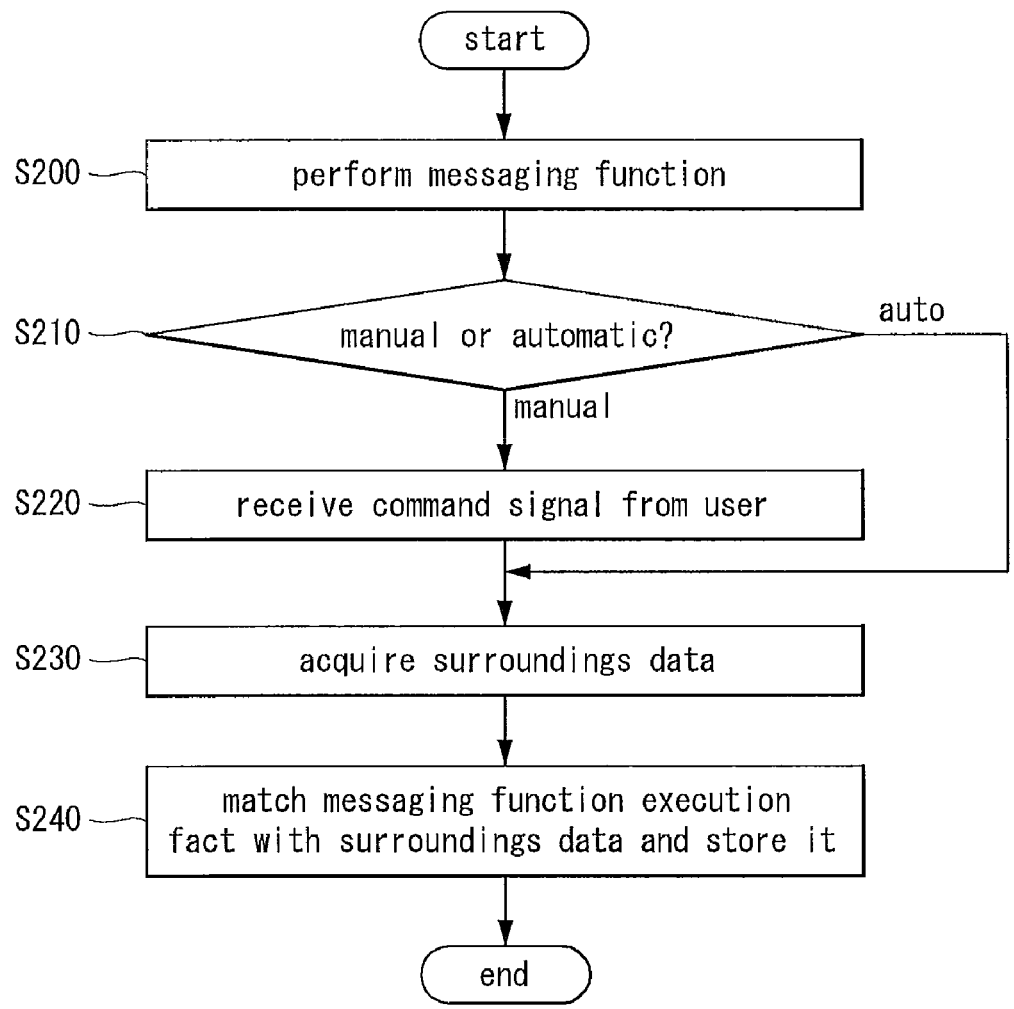
FIG. 10 is a flowchart illustrating a communication history method of a mobile terminal according to a second embodiment of the present invention.

Next, FIG. 10 is a flowchart illustrating a method of providing a communication history using a mobile terminal according to a second embodiment of the present invention. FIG. 10 is similar to the first embodiment shown in FIG. 5, except the function performed is the messaging function (e.g., SMS, MMS, email, etc.). As shown in FIG. 10, the controller 180 performs a messaging function (step S200). The messaging function includes sending and receiving messages such as emails, text messages, etc. The controller 180 can also perform the messaging function using a communication module such as the mobile communication module 112 and the wireless Internet module 113.

Then as shown in FIG. 10, the controller 180 determines whether the automatic or manual surrounding data acquisition has been set (step S210). Similar to the first embodiment, the user can set or change the automatic or manual surrounding data acquisition feature. If the controller 180 determines the manual surrounding data acquisition has been set (manual in step S210), the controller 180 receives a corresponding command signal from the user (step S220), and acquires the surrounding data according to the command signal (step S230). The corresponding command signal can be an image capture command signal, a moving image capture command signal, a record audio data command signal, etc. as discussed above.

The controller 180 can also temporarily or permanently store the acquired data in the memory 160. Then, when the surrounding data acquisition command signal has been received, the controller 180 acquires the surrounding data (step S230). Similar to the first embodiment, the controller 180 matches the captured surrounding data with information about the message function being performed and stores the matched result in a message history in the memory 160 (step S240).

If the controller 180 determines the acquisition mode is set to automatic in step S210, the controller 180 automatically captures the surrounding data based on preset options, for example, such as user predefined timing options, default settings, etc. Further, the controller 180 can also automatically select whether to use a still image, moving image or audio data as the surrounding data based on a state of the terminal. For example, if the battery was lower than a predetermined threshold, the controller 180 can choose to record audio data as the surrounding data, because recording audio data uses less power than recording moving image data. Similar comments apply to when the memory capacity on the terminal is below a predetermined threshold.

Figure 11:
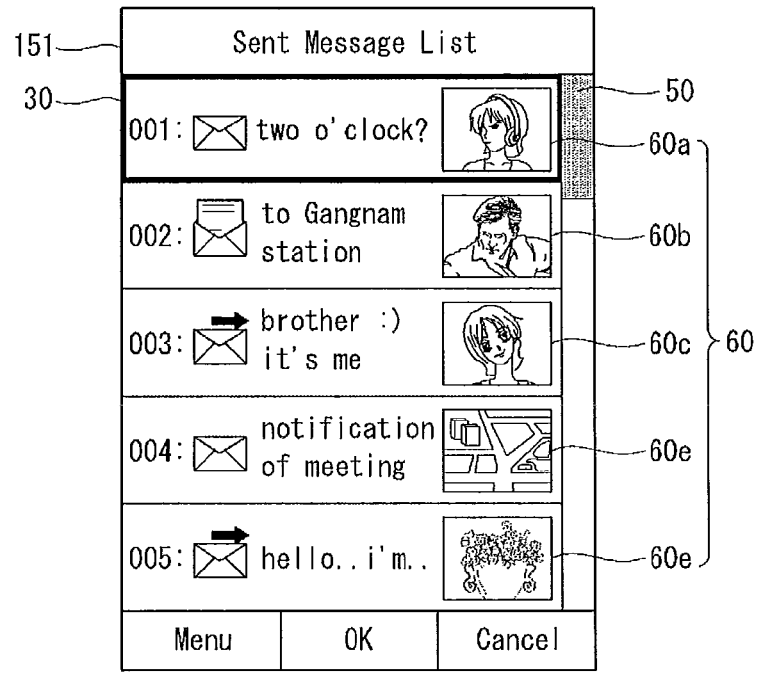
FIG. 11 is an overview of a display screen illustrating the communication history providing method according to the second embodiment of the present invention.

Next, FIG. 11 is an overview of a display screen illustrating a sent message history list. In FIG. 11, the controller 180 displays a still image 60 on the sent message history list and that was taken when a message sending function was performed. However, as discussed above, the controller 180 can provide any combination of a still image, moving image and sound information as the surrounding data to be matched with the message event. The first sent message 30 is also highlighted indicating the first sent message 30 is currently selected. This is similar to the other embodiments discussed above.

Further, the surrounding data can be captured at anytime during, after or before the call is started based on preset conditions or based on a user's request. Thus, the user is given great flexibility in capturing surrounding data that would better describe to the user the information, place, etc. about the call function, message function, etc.

In addition, the controller 180 can also control the display 151 to provide a tracking history including a history of outgoing or incoming calls for a particular party of the outgoing or incoming communication function when the outgoing or incoming communication is performed.

Further, the displayed history of outgoing or incoming calls for the particular party of the outgoing or incoming communication function can include all outgoing to incoming calls. Alternatively, the displayed history of outgoing or incoming calls for the particular party of the outgoing or incoming communication function can include only outgoing to incoming calls for a particular time period the outgoing or incoming communication function is performed.

In addition, the mobile terminal 100 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 12:
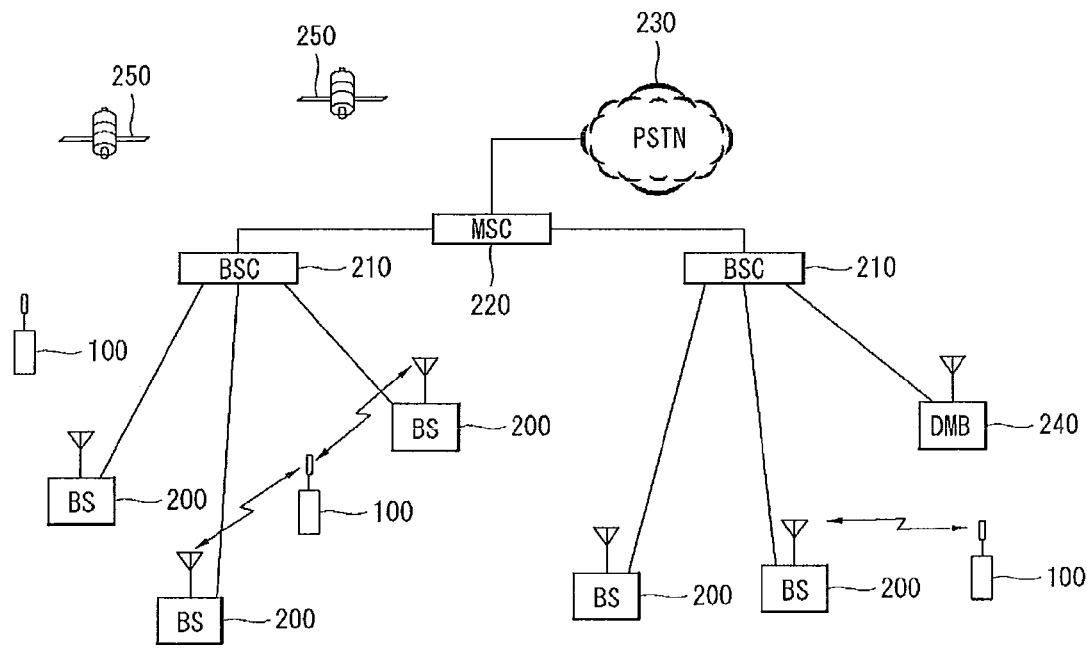
FIG. 12 is a block diagram illustrating a CDMA radio communication system that communicates with the mobile terminal shown in FIG. 1.

Next, FIG. 12 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via back haul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 12 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during operation of the wireless communication system, the base stations 270 receive sets of reverse-link signals from various mobile terminals 100. The mobile terminals 100 also engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

Further, the control method applicable to the above-configured mobile terminal 100 is explained with respect to various embodiments. However, the embodiments can be implemented independently or through combinations thereof In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180). A computer-readable recording medium may include all types of recording devices in which data readable by computer systems are stored. The example of the computer-readable recording devices includes ROMs, RAMs, CD-ROMs, DVD±ROMS, DVD-RAMS, magnetic tapes, floppy disks, hard disks, optical data storages, etc. Furthermore, the computer-readable recording medium can be distributed to computers connected over a network, so that computer-readable codes are stored and performed in a distributed manner.

In addition, the mobile terminal 100 may be implemented in a variety of different configurations. Examples of such configurations include a folder-type, slide-type, bar-type, rotational-type, swing-type and combinations thereof.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a communication unit configured to provide a communication function including at least one of an outgoing communication function and an incoming communication function;
a controller configured to acquire surrounding data including at least one of image data or sound data corresponding to a surrounding of where the mobile terminal is located when the communication function is performed, and to match the acquired surrounding data with communication information indicating a first party of the outgoing communication function or a second party of the incoming communication function, wherein the first party and the second party are another party different from a user of the mobile terminal; and
a display unit,
wherein the communication history includes the communication information matched with the surrounding data,
wherein the controller is further configured to acquire the surrounding data selectively based on a) a manual operation of the terminal or b) automatically without user intervention,
wherein the controller is further configured to simultaneously display a communication history and the surrounding data in the form of a list including a plurality of communication items respectively corresponding to a plurality of other parties different from the user of the mobile terminal on the display unit when the communication history is retrieved in response to a command from the user, and
wherein the controller is further configured to display the plurality of communication items such that the each communication item includes the corresponding communication information and the corresponding surrounding data.

2. The mobile terminal of claim 1, wherein the surrounding data includes at least one of still image data, moving image data and audio data.

3. The mobile terminal of claim 1, wherein the communication information further indicates at least one of a time of the outgoing communication function or the incoming communication function, and a duration of the outgoing communication function or the incoming communication function.

4. The mobile terminal of claim 1, wherein the communication function includes at least one of a messaging function, a calling function and a called function.

5. The mobile terminal of claim 4, wherein when the communication function includes the calling function or called function, the communication history includes at least one of a dialed call item, a received call item and a missed call item, and wherein when the communication function includes the messaging function, the communication history includes at least one of a sent message item and a received message item.

6. The mobile terminal of claim 1, wherein the controller is further configured to control the display unit to display a tracking history including the communication history for outgoing or incoming calls for a particular party of the outgoing or incoming communication function when the outgoing or incoming communication is performed.

7. The mobile terminal of claim 6, wherein the displayed communication history for the outgoing or incoming calls for the particular party includes all outgoing and incoming calls.

8. The mobile terminal of claim 6, wherein the displayed communication history for the outgoing or incoming calls for the particular party includes only outgoing and incoming calls for a particular time period the outgoing or incoming communication function is performed.

9. The mobile terminal of claim 1, wherein the controller is further configured to control the display unit to display the communication information and the surrounding data to be transparently overlapped with each other.

10. The mobile terminal of claim 1, wherein the surrounding data includes image data and the controller is further configured to control the display unit to display a plurality of acquired images for a single communication function.

11. A method of controlling a mobile terminal, the method comprising:
acquiring surrounding data including at least one of image data or sound data corresponding to a surrounding of where the mobile terminal is located when a communication function is performed on the terminal, said communication function including at least one of an outgoing communication function and an incoming communication function;
matching the acquired surrounding data with communication information indicating a first party of the outgoing communication function or a second party of the incoming communication function, wherein the first party and the second party are another party different from a user of the mobile terminal; and
displaying a communication history and the surrounding data at the same time,
wherein the communication history includes the communication information matched with the surrounding data,
wherein the acquiring step acquires the surrounding data selectively based on a) a manual operation of the terminal or b) automatically without user intervention, and
wherein the displaying step further comprises:
simultaneously displaying the communication history and the surrounding data in the form of a list including a plurality of communication items respectively corresponding to a plurality of other parties different from the user of the mobile terminal when the communication history is retrieved in response to a command from the user; and
displaying the plurality of communication items such that the each communication item includes the corresponding communication information and the corresponding surrounding data.

12. The method of claim 11, wherein the surrounding data includes at least one of still image data, moving image data and audio data.

13. The method of claim 11, wherein the communication information further indicates at least one of a time of the outgoing communication function or the incoming communication function, and a duration of the outgoing communication function or the incoming communication function.

14. The method of claim 11, wherein the communication function includes at least one of a messaging function, a calling function and a called function.

15. The method of claim 14, wherein when the communication function includes the calling function or called function, the communication history includes at least one of a dialed call item, a received call item and a missed call item, and
wherein when the communication function includes the messaging function, the communication history includes at least one of a sent message item and a received message item.

16. The method of claim 11, wherein the displaying step further comprises displaying a tracking history including the communication history for outgoing or incoming calls for a particular party of the outgoing or incoming communication function when the outgoing or incoming communication is performed.

17. The method of claim 16, wherein the displayed communication history for the outgoing or incoming calls for the particular party includes all outgoing and incoming calls.

18. The method of claim 16, wherein the displayed communication history for the outgoing or incoming calls for the particular party includes only outgoing and incoming calls for a particular time period the outgoing or incoming communication function is performed.

19. The method of claim 11, wherein the displaying step further comprises displaying the communication information and the surrounding data to be transparently overlapped with each other.

20. The method of claim 11, wherein the surrounding data includes image data and displaying step further comprises displaying a plurality of acquired images for a single communication function.

21. The mobile terminal of claim 2, wherein the controller is further configured to reproduce the surrounding data included in a specific communication item when the specific communication item of the plurality of communication items is selected.

22. The method of claim 11, further comprising:
reproducing the surrounding data included in a specific communication item when the specific communication item of the plurality of communication items is selected.

23. The mobile terminal of claim 1, wherein when the communication function is performed, the controller is further configured to acquire the surrounding data without first displaying previously stored history information.

24. The method of claim 11, wherein when the communication function is performed, the acquiring step acquires the surrounding data without first displaying previously stored history information.

* * * * *